United States Patent [19]

Henning et al.

[11] 4,316,023
[45] Feb. 16, 1982

[54] ISOINDOLINE COLORANTS

[75] Inventors: Georg Henning, Ludwigshafen; Wolfgang Lotsch, Beindersheim, both of Fed. Rep. of Germany

[73] Assignee: BASF Aktiengesellschaft, Ludwigshafen, Fed. Rep. of Germany

[21] Appl. No.: 137,272

[22] Filed: Apr. 4, 1980

[30] Foreign Application Priority Data

Apr. 7, 1979 [DE] Fed. Rep. of Germany ....... 2914086

[51] Int. Cl.³ ............................................. C09B 57/04
[52] U.S. Cl. ..................................... 544/300; 106/23; 106/288 Q; 260/37 P
[58] Field of Search ........................ 544/300, 321, 320

[56] References Cited

U.S. PATENT DOCUMENTS 3,646,033 2/1972 Leister et al. ........................ 544/284
3,991,054 11/1976 Bock et al. ........................... 544/300

FOREIGN PATENT DOCUMENTS 2041999 3/1972 Fed. Rep. of Germany .
2814526 12/1978 Fed. Rep. of Germany .

*Primary Examiner*—Paul M. Coughlan, Jr.

*Attorney, Agent, or Firm*—Oblon, Fisher, Spivak, McClelland & Maier

[57] ABSTRACT

Isoindoline colorants of the general formula

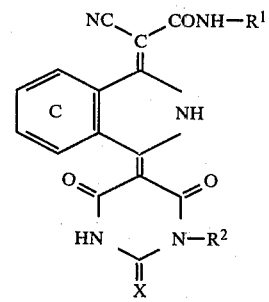

where
$R^1$ is $C_1$-$C_4$-alkyl,
$R^2$ is hydrogen or $C_1$-$C_4$-alkyl and
X is oxygen, sulfur, imino or N-cyanoimino, and the ring C may or may not be substituted by groups which do not confer solubility.

In surface coatings, printing inks and plastics, the colorants give very deep and brilliant yellow colorations which have good to very good lightfastness and fastness to overcoating.

5 Claims, No Drawings

ISOINDOLINE COLORANTS

The present invention relates to novel isoindoline colorants and their use.

The novel isoindoline colorants have the general formula I

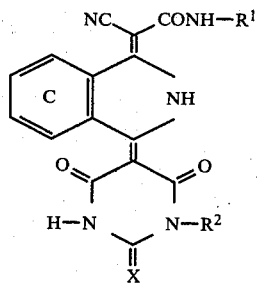

where
- R$^1$ is C$_1$–C$_4$-alkyl,
- R$^2$ is hydrogen or C$_1$–C$_4$-alkyl and
- X is oxygen, sulfur, imino or cyanoimino, and the ring C may or may not be substituted by groups which do not confer solubility.

In surface coatings, printing inks and plastics, the novel isoindoline colorants of the formula I give brilliant yellow colorantions of high tinctorial strength and good to very good lightfastness and fastness to overcoating. The novel colorants have substantially higher tinctorial strength than the colorant disclosed in German Laid-Open Application DOS 1,670,748, Example 76 (formula I, with R$^1$=R$^2$=H and X=O).

Suitable substituents R$^1$ and R$^2$ include ethyl, n-propyl, isopropyl, n-butyl, isobutyl and sec.-butyl and preferably methyl. For R$^2$, hydrogen is particularly preferred.

Substituents which do not confer solubility are those which do not cause the colorants to be soluble, either in water or in organic solvents. Examples of such substituents are halogen, C$_1$–C$_6$-alkyl, C$_1$–C$_6$-alkoxy, nitro, aryl, eg. phenyl, carbamyl and C-acylamino.

Preferred substituents which do not confer solubility are chlorine, bromine, C$_2$–C$_4$-alkanoylamino and benzoylamino.

Preferred compounds of the formula I are those of the formula II:

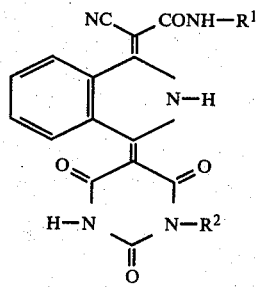

where R$^1$ and R$^2$ have the above meanings. The compound of the formula III

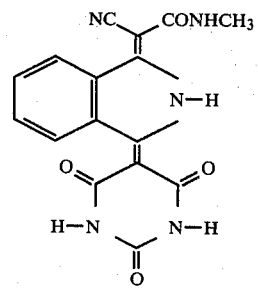

is very particularly preferred.

The colorants of the formula I are obtained by condensing one mole of a diiminoisoindoline of the formula IV

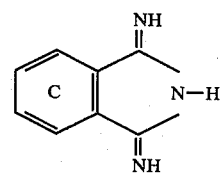

with one mole of the cyanoacetamide of the formula V

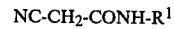

to give the 1-(cyano-carboxamide-methylene)-3-iminoisoindoline (=semi-condensation product) of the formula VI:

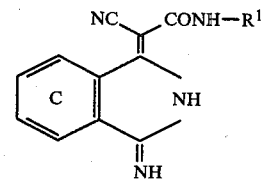

which is condensed, in a second stage, with one mole of the compound of the formula VII

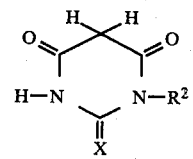

to give the compound of the formula I. In these formulae, R$^1$, R$^2$, C and X have the above meanings.

The synthesis of the isoindoline colorants (I) can, according to German Laid-Open Application DOS No. 1,670,748, be carried out in a two-stage process in the presence of organic solvents or diluents, with intermediate isolation of the semi-condensation product (VI).

The reaction of a semi-condensation product (VI) with a barbituric acid derivative (VII) takes place particularly efficiently in an aliphatic carboxylic acid, eg. acetic acid, propionic acid, butyric acid or a mixture of these, and therefore these solvents are preferred for the second reaction step. When they are used, the process of preparation gives colorants which may be used directly for pigmentary purposes.

Particularly valuable pigmentary forms of the colorants (I) are obtained if both the reaction steps are carried out in water, in the presence or absence of a surfactant, without intermediate isolation of the semi-condensation products. In that case, the condensation of the 1,3-diiminoisoindoline (IV) with the cyanoacetamide derivative (V) is carried out at from 10° to 100° C. and at a pH above 7, preferably at a pH of from 8 to 11. The condensation of the semi-condensation product (IV) with the barbituric acid (VII) is carried out at from 40° to 150° C. and at a pH below 7, preferably at from 1 to 3.

The amount of solvent or diluent used is not critical, provided the reaction mixture can be stirred. In general, the amount used is from 5 to 40, especially from 7 to 20, the amount by weight of the diiminoisoindoline (IV).

Where the synthesis is carried out in a predominantly aqueous medium, or in water, surfactants may or may not be present. However, their presence is preferred, since this as a rule results in more easily dipersible, deeply colored pigmentary forms. The surfactant may be added both when carrying out the condensation in the first reaction stage, and before or after carrying out the condensation in the second reaction stage. The amount of the surfactant or surfactants used is not critical and can therefore be varied within wide limits. Advantageously, the lower limit is about 5% by weight, based on diiminoisoindoline. Suitable amounts to use are from 5 to 400% by weight, preferably from 10 to 100% by weight, based on the amount of diiminoisoindoline employed.

Suitable surfactants are the nonionic, anionic or cationic compounds conventionally used as dispersants, wetting agents and/or protective colloids.

Examples of suitable anionic surfactants are: $C_4$–$C_{20}$-alkylbenzenesulfonic acids, $C_4$–$C_{20}$-alkylphenolsulfonic acids, mono- and bis-$C_1$–$C_{10}$-alkylnaphthalenesulfonic acids, partially sulfonated polystyrene water-soluble condensation products of β-naphthalenesulfonic acids and/or $C_1$–$C_{10}$-alkyl-β-naphthalenesulfonic acids and formaldehyde, condensation products of phenolsulfonic acids, formaldehyde and urea, condensation products of phenol, urea, formaldehyde and sodium sulfite, condensation products of phenol and formaldehyde which have been post-condensed with phenolsulfonic acid, urea and formaldehyde, lignisulfonic acids, long-chain fatty acids and resin acids, all these compounds being in the form of the alkali metal salts, alkaline earth metal salts or ammonium salts.

Examples of nonionic surfactants are adducts of ethylene oxide and/or propylene oxide with alkanols, alkanediols, alkanepolyols, phenols, carboxylic acids, carboxylic acid amides, monoamines, diamines and polyamines. Other suitable materials are water-swellable or water-soluble polymers, eg. polyvinylpyridine and poly-N-vinylpyrrolidone, and copolymers of water-soluble monomers, eg. N-vinylpyrrolidone, acrylamide and/or acrylic acid, with water-insoluble monomers, eg. acrylonitrile, methacrylic acid esters, acrylic acid esters, vinyl acetate, vinyl chloride and/or styrene, as well as polyvinyl alcohol, $C_{10}$–$C_{20}$-fatty alcohols and condensation products of isobutyraldehyde, formaldehyde and urea.

The surfactants may also be used in the form of mixtures.

Preferred surfactants are $C_1$–$C_5$-alkylnaphthalenesulfonic acids in the form of their salts, condensation products of phenol, urea and formaldehyde, adducts of ethylene oxide and/or propylene oxide with $C_2$–$C_{20}$-alkanols, alkanediols, alkanetriols, aliphatic $C_{10}$–$C_{20}$-carboxylic acids and/or their amides, $C_{10}$–$C_{20}$-fatty alcohols and condensation products of isobutyraldehyde, formaldehyde and urea.

The products can be isolated from the reaction mixture in a conventional manner and can in general be employed direct as a pigment. However, the products can also be converted, by conventional conditioning processes, into the optimum pigmentary form for their envisaged end use.

The Examples which follow illustrate the invention. Parts and percentages are by weight.

EXAMPLE 1

21 parts of the monoadduct of ethylene glycol with diiminoisoindoline, and 10 parts of N-methylcyanoacetamide, are stirred with 300 parts of water and 30 parts of concentrated ammonia solution for 2 hours at 90° C. When the mixture has cooled to 60° C., the pH is brought to 2 with 20% strength sulfuric acid. 13 parts of barbituric acid are then introduced and stirring is continued for 2 hours at 90° C. The product is filtered off hot, washed neutral with water and dried. 27 parts of the pigment of the formula III are obtained.

In printing inks, surface coatings and plastics, the pigment gives very deep, brilliant greenish yellow colorations having good lightfastness and good fastness to migration.

EXAMPLE 2

The procedure described in Example 1 is followed, except that the diiminoisoindoline is condensed with N-methylcyanoacetamide at 25° C. for 2 hours. The pH in the reaction mixture is then brought to 2 and a solution, at 70° C., of 13 parts of barbituric acid in 150 parts of water is run in. The mixture is stirred for 3 hours at 90° C. whilst keeping the pH at 2–2.3. 27 parts of the pigment of the formula III are obtained; when this is incorporated into printing inks, surface coatings and plastics, it gives colorations similar to those obtained with the pigment prepared as described in Example 1.

EXAMPLE 3

The procedure described in Example 1 is followed, except that after lowering the pH to 2, 5 parts of sodium $C_{13}$–$C_{17}$-paraffindisulfonate are added, the mixture is stirred for 3 hours at 95° C. and the product is filtered off hot, washed neutral and free from assistants, and dried. 27 parts of the pigment of the formula III are obtained; when incorporated into printing inks, the product gives a good gloss.

EXAMPLE 4

21 parts of the monoadduct of ethylene glycol with diiminoisoindoline and 10 parts of N-methylcyanoacetamide in 200 parts of methanol are refluxed for 3 hours. When the mixture has cooled, the product is filtered off, washed with metanol and dried. 20 parts of the compound of the formula VIII

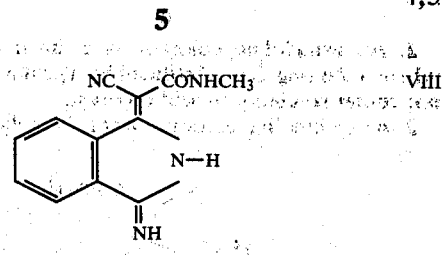

are obtained.

23 parts of the compound of the formula VIII and 14 parts of barbituric acid in 300 parts of glacial acetic acid are boiled for 3 hours. The product is filtered off whilst still warm, washed with glacial acetic acid and methanol, and dried. 29 parts of the compound of the formula III are obtained.

In surface coatings and plastics, the pigment gives particularly high-hiding greenish yellow colorations having very good lightfastness and fastness to migration.

EXAMPLES 5-9

Yellow pigments with similar properties and having the hues shown are obtained if the procedure of Examples 1-4 is followed and the cyanoacetamide and barbituric acids listed in the Table are condensed with diiminoisoindoline.

EXAMPLE 10 (USE EXAMPLE)

(a) Surface coating 10 parts of the colorant obtained as described in Example 1 and 95 parts of a baking finish mixture, which contains 70% of coconut alkyd resin (as a 60% solution in xylene) and 30% of melamine resin (as a solution of about 55% strength in butanol/xylene) are milled in an attrition mill. After applying the finish and baking for 30 minutes at 120° C., greenish yellow full-shade coatings having good lightfastness and fastness to overspraying are obtained. If titanium dioxide is admixed, greenish yellow white reductions are obtained.

If the colorants described in Examples 2 to 9 are used, coatings with similar hues and similar properties are obtained.

(b) Plastic 0.5 part of the colorant obtained as described in Example 4 is applied to 100 parts of polystyrene granules (standard grade) by tumbling. The colored granules are homogenized by extrusion at 190°–195° C. Greenish yellow extrudates with good lightfastness are obtained. If a mixture of 0.5 part of colorant and 1 part of titanium dioxide is used, high-hiding, greenish yellow colorations are obtained.

If the colorants obtained as described in Examples 1, 2, 3 or 5–9 are used, similar colorations result.

(c) Printing ink 8 parts of the colorant obtained as described in Example 3, 40 parts of a rosin modified with phenol/formaldehyde and 55–65 parts of toluene are thoroughly

| Example | Cyanoacetamide | Barbituric acid | Colorant of the formula I, with | Hue |
|---|---|---|---|---|
| 5 | NC—CH$_2$CONHC$_2$H$_5$ | (barbituric acid, X=O) | R$_1$ = —C$_2$H$_5$<br>R$_2$ = —H<br>X = O | greenish yellow |
| 6 | NC—CH$_2$CONHCH$_3$ | (barbituric acid, N-CH$_3$, X=O) | R$_1$ = —CH$_3$<br>R$_2$ = —CH$_3$<br>X = O | neutral yellow |
| 7 | NC—CH$_2$—CONHCH$_3$ | (barbituric acid, N-C$_2$H$_5$, X=O) | R$_1$ = —CH$_3$<br>R$_2$ = —C$_2$H$_5$<br>X = O | neutral yellow |
| 8 | NC—CH$_2$CONHCH$_3$ | (barbituric acid, X=S) | R$_1$ = —CH$_3$<br>R$_2$ = —H<br>X = S | orange |
| 9 | NC—CH$_2$CONHCH$_3$ | (barbituric acid, X=NCN) | R$_1$ = —CH$_3$<br>R$_2$ = —H<br>X = NCN | neutral yellow | mixed in a disperser. A greenish yellow toluene-based gravure printing ink is obtained. The prints obtained with this ink have good lightfastness.

If the colorants from Examples 1, 2 or 4–8 are used, similar results are obtained.

We claim:

1. An isoindoline colorant insoluble in water and organic solvents of the formula

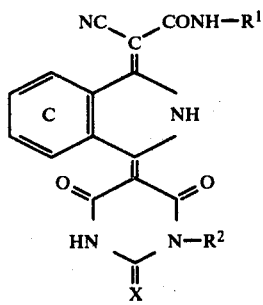

where
$R^1$ is $C_1$–$C_4$-alkyl,
$R^2$ is hydrogen or $C_1$–$C_4$-alkyl and
X is oxygen, sulfur, imino or N-cyanoimino.

2. An isoindoline colorant as claimed in claim 1, wherein the ring C is substituted by a group which does not confer solubility to said colorant.

3. An isoindoline colorant of the formula

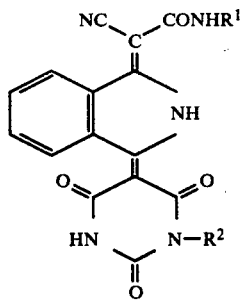

where
$R^1$ is $C_1$–$C_4$-alkyl and
$R^2$ is hdyrogen or $C_1$–$C_4$-alkyl.

4. An isoindoline colorant as claimed in claim 3, where $R^1$ is methyl and $R^2$ is hydrogen.

5. An isoindoline colorant as claimed in claim 2, wherein the ring C is substituted by chlorine, bromine, $C_2$–$C_4$-alkanoylamino or benzoylamino.

* * * * *